United States Patent [19]

Auyeung et al.

[11] 4,233,518
[45] Nov. 11, 1980

[54] FUEL STORAGE RACK

[75] Inventors: Sean Auyeung, Windsor; William W. Etzel, East Hartland, both of Conn.

[73] Assignee: Combustion Engineering, Inc., Windsor, Conn.

[21] Appl. No.: 958,289

[22] Filed: Nov. 6, 1978

[51] Int. Cl.² ............................................. G21F 5/00
[52] U.S. Cl. .................................... 250/507; 250/515
[58] Field of Search ....................... 250/506, 507, 515

[56] References Cited
U.S. PATENT DOCUMENTS

| | | | |
|---|---|---|---|
| 4,088,897 | 5/1978 | Soot | 250/507 |
| 4,139,778 | 2/1979 | Raymond | 250/507 |

Primary Examiner—Harold A. Dixon
Attorney, Agent, or Firm—Edward L. Kochey, Jr.

[57] ABSTRACT

A storage rack for nuclear fuel assemblies is located in the pool and formed of grids, each grid formed of fixedly connected cross members. Four separate grids are used with each of the four grids horizontally restrained by adjacent walls in a manner which restrains forces perpendicular to each wall but permits sliding in response to forces parallel to each wall. Each of the grids are supported at locations between the grids, by members which slidably support the grids. The support members are further slidably supported on a central column.

4 Claims, 3 Drawing Figures

FUEL STORAGE RACK

BACKGROUND OF THE INVENTION

This invention relates to nuclear fuel storage apparatus for storage of fuel within water-filled pools, and in particular to such a storage rack for use in seismic areas.

Fuel assemblies for nuclear reactors are conventionally stored both before and after use in water-filled pools. They are supported at a lower elevation and restrained within a grid work at an upper elevation.

In the event of an earthquake the horizontal translation of the fuel assemblies imposes significant forces on the grid structure which is in turn transmitted to the pool wall. These forces are passed to the wall by compression with no contribution of a tension force from the opposite wall. The structure cannot be rigidly connected on all four sides since provisions must be made for expansion of the members due to the heat generated within the pool.

The imposition of the full acceleration force of the entire storage rack on a single wall requires that each of the walls be structurally designed for these large forces. Furthermore, when a storage pool has been designed for moderate fuel storage and the fuel storage capabilities of the rack increase, the preexisting design strength of the wall may be insufficient to take new, increased loadings.

SUMMARY OF THE INVENTION

In the invention the fuel storage rack is formed of four independent grid structures. Each grid structure is restrained on only its two adjacent walls. It is restrained in a manner which will restrain forces perpendicular to the wall but will not restrain forces parallel to the wall. The interaction between the two adjacent walls which are at 90° from one another permits the absorption of forces in all directions.

The grid structures are slidably supported at locations between the adjacent grids so that all expansion forces are taken at the central slidable supports.

In an earthquake situation each of the four quadrants operates only on the adjacent walls to absorb the forces with two quadrants operating in compression and the other two in tension during any particular earthquake acceleration. Accordingly, the forces imposed on the walls are reduced to one half of the preexisting forces if the fuel storage facility is divided into four equal quadrants. Even where it is not equally divided, there is still a substantial reduction in the forces transmitted to the wall.

DESCRIPTION OF THE PREFERRED EMBODIMENT

Figure 1:
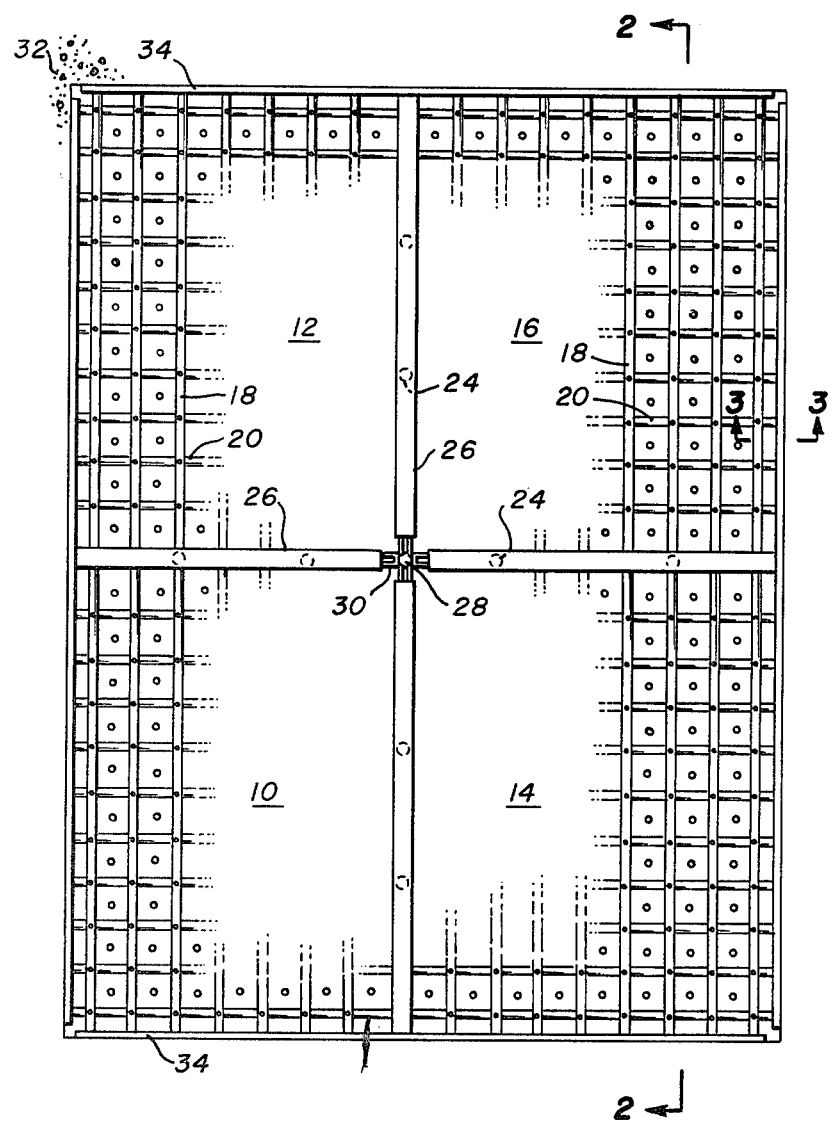
FIG. 1 is a plan elevation of the fuel storage facility.
Figure 2:
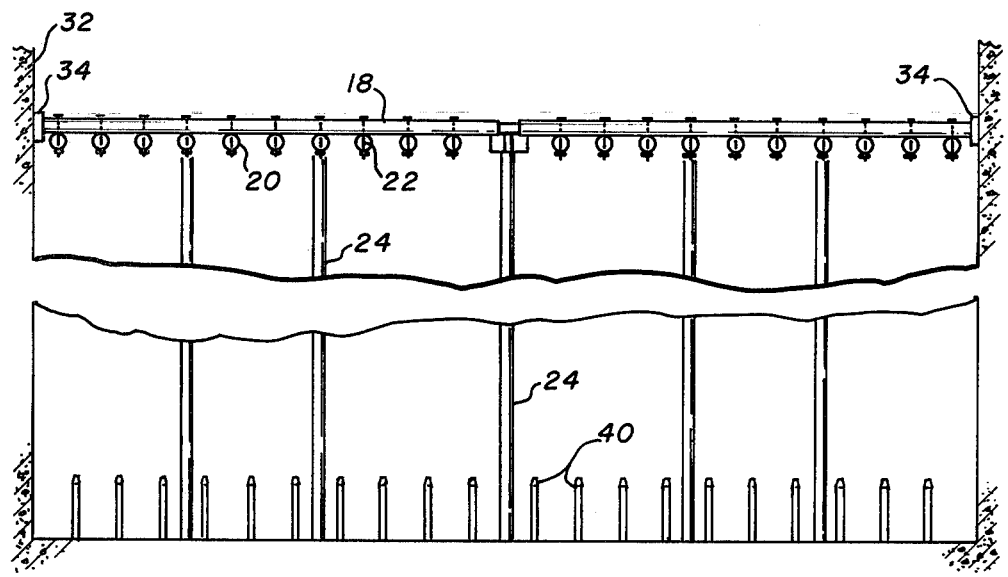
FIG. 2 is a side elevation of the facility.

Four grids 10, 12, 14, and 16 are each formed of horizontal cross members 18 and 20. Each of these is in the form of a pipe, and they are fastened at their intersections by vertical bolts 22. These provide fixed connections at the intersections, which need not be rigid but need only reliably transfer forces from one horizontal member to the other.

Each of the grids is supported around its periphery. In the area between adjacent grids, vertical support columns 24 support horizontal I beams 26. The cross members 18 and 20 rest on the lower flange of the I beam support members so that the support members will vertically support the grid structure but because of sliding action will not restrain any horizontal forces in any direction. This not only avoids the transfer of horizontal forces to or through the support member during a seismic disturbance, but also permits expansion of the individual grids without the imposition of thermal stresses.

The support members 26 are supported at a central location on column 28 which carries a double H support member 30. The horizontal extensions of this double H support member encompass the web of the I beam and support the support members by the inner edge of their upper flange.

Figure 3:
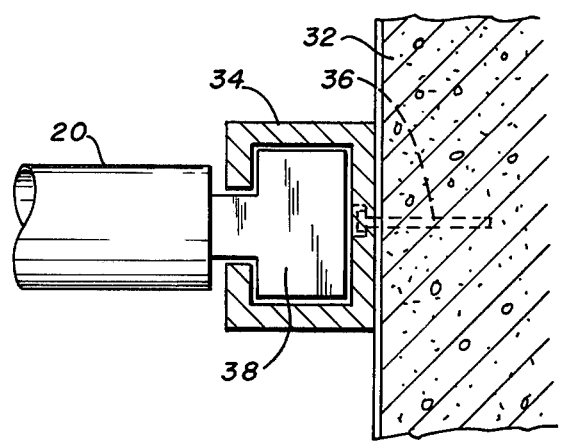
FIG. 3 is a sectional elevation through a connection between a grid structure and the wall of the pool.

The support of the outer edges of each of the grids is best seen in FIG. 3. The wall 32 of the pool carries a horizontal C member 34 which is rigidly connected to the wall and the earth through anchor bolt 36. Cross members 18 and 20 are fastened to a T-shaped member 38 in a rigid fashion, such as by welding. It can, therefore, be seen that seismic forces passing through member 18 will be restrained in a direction perpendicular to the wall by the interaction between the T member and the C member, while forces in a direction parallel to the wall will permit sliding of the two members. Accordingly, the entire facility is free to expand with the corners of the pool being the zero expansion point for each of the four grids.

Floor alignment pins 40 serve to support the fuel assemblies and may also be operative to absorb horizontal forces during an earthquake. Alternately other support means could be used with the alignment pins still operating to absorb horizontal movement or an additional grid structure similar to the upper structure could be supplied to restrain movement at a lower elevation.

What is claimed is:

1. A fuel storage rack for the storage of nuclear fuel assemblies in a pool of water comprising: a rectangular pool having four walls; four grids, each formed of fixedly connected cross members and positioned in the four quadrants of the pool; means for supporting each grid at an upper elevation permitting grid expansion movement with respect to the walls; means for supporting fuel to be stored within said grids, located at a lower elevation; means for supporting each grid at the two adjacent walls, while permitting expansion of the grid parallel to at least one wall; means for restraining horizontal motion of each of said grids, said means operative to restrain in both directions perpendicular to each wall while permitting expansion parallel to each wall.

2. An apparatus as in claim 1: having also a support member located between adjacent grids, each grid slidably supported from said support member.

3. An apparatus as in claim 2: having support members located between each pair of grids; and a central support column slidably supporting each of said support members.

4. An apparatus as in claim 1: wherein said means for restraining horizontal motion comprises: a first horizontal member securely attached to the wall; a second horizontal member securely attached to said grid; and one of said first and second members being a C-shaped member, the other being a T-shaped member and engaging said C-shaped member.

* * * * *